(12) United States Patent
Sasai

(10) Patent No.: US 6,915,026 B2
(45) Date of Patent: Jul. 5, 2005

(54) IMAGE PROCESSING METHOD AND APPARATUS

(75) Inventor: Toshihiro Sasai, Kyoto (JP)

(73) Assignee: Nucore Technology Inc., Sunnyvale, CA (US)

(*) Notice: Subject to any disclaimer, the term of this patent is extended or adjusted under 35 U.S.C. 154(b) by 755 days.

(21) Appl. No.: 10/053,487

(22) Filed: Nov. 2, 2001

(65) Prior Publication Data

US 2003/0086007 A1 May 8, 2003

(51) Int. Cl.$^7$ .............................. G06K 9/32
(52) U.S. Cl. ............ 382/300; 382/282; 382/293; 382/298; 358/1.2; 358/525; 358/528
(58) Field of Search ................... 382/171, 190, 382/205, 282, 293, 298, 299, 300; 358/1.2, 525, 528, 449, 451

(56) References Cited

U.S. PATENT DOCUMENTS

| | | | |
|---|---|---|---|
| 5,504,531 A | | 4/1996 | Knee et al. |
| 5,861,917 A | * | 1/1999 | Tariki et al. ............. 348/230.1 |
| 6,023,537 A | * | 2/2000 | Wada et al. ................ 382/312 |
| 6,464,332 B1 | * | 10/2002 | Silverbrook et al. .......... 347/42 |
| 6,493,469 B1 | * | 12/2002 | Taylor et al. ............... 382/284 |
| 6,546,152 B1 | * | 4/2003 | Hou .......................... 382/284 |

FOREIGN PATENT DOCUMENTS

| | | |
|---|---|---|
| EP | 0367418 A2 | 5/1990 |
| EP | 0706154 A1 | 4/1996 |
| EP | 0800687 A1 | 6/1996 |
| JP | 1-236867 | 9/1989 |
| JP | 11-25067 | 1/1999 |

* cited by examiner

*Primary Examiner*—Bhavesh M. Mehta
*Assistant Examiner*—Yosef Kassa
(74) *Attorney, Agent, or Firm*—Townsend and Townsend and Crew LLP

(57) ABSTRACT

In an image processing method, a square submatrix formed from adjacent original pixels is equally divided into small square regions along the X- and Y-coordinate axes. Approximate points are set at the vertexes of the regions. Interpolation coefficients are derived based on a predetermined interpolation function. Interpolation coefficients normalized so as to adjust the sum of the coefficient values of interpolation coefficients used for one interpolation operation to $2^k$ (k is a positive integer) are calculated, and stored in a coefficient buffer in advance. A new pixel position of each pixel constituting a new image is calculated in accordance with magnifications representing enlargement/reduction ratios along the X- and Y-coordinate axes for an original image. An approximate point closest to the new pixel position is selected as the approximate point of the new pixel position. Interpolation coefficients corresponding to the interpolation original pixels are read out from the coefficient buffer. Interpolation operation is performed by product-sum operation, thereby calculating a pixel value at the approximate point. The calculated pixel value is divided by $2^k$ to output a pixel value at the new pixel position. An image processing apparatus is also disclosed.

24 Claims, 8 Drawing Sheets

| DISTANCE x FROM P(i) TO INTERPOLATION POSITION | APPROXIMATE POINT | INTERPOLATION COEFFICIENT CORRESPONDING TO EACH ORIGINAL PIXEL POSITION |
|---|---|---|
| $0 \leq x < \frac{1}{2^{n+1}}$ | 0 | $W(-1), W(0), W(1), W(2),$ |
| $\frac{1}{2^{n+1}} \leq x < \frac{3}{2^{n+1}}$ | $\frac{1}{2^n}$ | $W(-1-\frac{1}{2^n}), W(-\frac{1}{2^n}), W(1-\frac{1}{2^n}), W(2-\frac{1}{2^n})$ |
| ... | ... | ... |
| $\frac{2h-1}{2^{n+1}} \leq x < \frac{2h+1}{2^{n+1}}$ | $\frac{h}{2^n}$ | $W(-1-\frac{h}{2^n}), W(-\frac{h}{2^n}), W(1-\frac{h}{2^n}), W(2-\frac{h}{2^n})$ |
| ... | ... | ... |
| $1-\frac{1}{2^{n+1}} \leq x < 1$ | 1 | $W(0), W(1), W(2), W(3),$ |

FIG. 7

FOR m = 2, n = 2, and k = 4

| DISTANCE x | INTERPOLATION COEFFICIENT w | NORMALIZED INTERPOLATION COEFFICIENT W | INTEGERIZED INTERPOLATION COEFFICIENT Wi | SET |
|---|---|---|---|---|
| -8/4 | 0 | 0 | 0 | A |
| -7/4 | -0.046875 | -0.75 | -1 | B |
| -6/4 | -0.125 | -2 | -2 | C |
| -5/4 | -0.140625 | -2.25 | -2 | D |
| -4/4 | 0 | 0 | 0 | A |
| -3/4 | 0.296875 | 4.75 | 5 | B |
| -2/4 | 0.625 | 10 | 10 | C |
| -1/4 | 0.890625 | 14.25 | 14 | D |
| 0 | 1 | 16 | 16 | A |
| 1/4 | 0.890625 | 14.25 | 14 | B |
| 2/4 | 0.625 | 10 | 10 | C |
| 3/4 | 0.296875 | 4.75 | 5 | D |
| 4/4 | 0 | 0 | 0 | A |
| 5/4 | -0.140625 | -2.25 | -2 | B |
| 6/4 | -0.125 | -2 | -2 | C |
| 7/4 | -0.046875 | -0.75 | -1 | D |
| 8/4 | 0 | 0 | 0 | A |

FIG. 8

○ : ORIGINAL PIXEL
● : INTERPOLATION POSITION
× : APPROXIMATE POINT

IMAGE PROCESSING METHOD AND APPARATUS

BACKGROUND OF THE INVENTION

The present invention relates to an image processing method and apparatus and, more particularly, to an image processing method and apparatus for obtaining a desired image by performing interpolation operation for a two-dimensional image sensed by an image sensing apparatus such as an electronic camera.

To execute image processing such as enlargement/reduction with high quality for a two-dimensional image sensed by an image sensing apparatus such as an electronic camera, product-sum operation (convolution operation) using many pixels and high-order interpolation coefficients must be done as interpolation operation. At this time, a time spent for interpolation operation increases for a larger number of original pixels used or higher-precision interpolation coefficients. If the interpolation coefficient at a new pixel position different from the pixel position of an original image, i.e., at an interpolation position is calculated for every position, complicated operations increase, requiring a very long time.

Interpolation operation using a personal computer as post-processing for a sensed image is time-consuming. In an image sensing apparatus such as an electronic camera, however, long-time interpolation operation inhibits quickly checking a sensed image. In such a case, an image sensing apparatus such as a video camera that requires an image in real time is not suitable for practical use.

A stay-at-home type image processing apparatus which receives sufficient operation power from an AC power supply or the like can shorten the time of interpolation operation by using a high-speed processor at the cost of power consumption or a cost for a high-speed operation chip and memory. This solution, however, cannot be applied to a portable apparatus which receives only limited operation power.

To solve the above problem, various methods for simplifying interpolation operation have conventionally been proposed. For example, Japanese Patent Laid-Open No. 11-25067 discloses a method of calculating an interpolation coefficient at high speed. Japanese Patent Laid-Open No. 1-236867 discloses a method of calculating in advance the product of a pixel value at an original pixel and an interpolation coefficient at a pixel position for each partial region to which the enlarged pixel position belongs, and storing the product in a table.

In the former case, the conventional image processing method suffers low processing efficiency due to calculation of an interpolation coefficient every interpolation position. In the latter case, to reduce an approximation error, a region where an interpolation position is approximated is downsized, or the number of original pixels used for calculation is increased for higher-order interpolation operation. This results in a larger number of data calculated in advance and a larger memory area used to store a reference table.

Particularly in the latter case, interpolation operation is done using approximate points set by dividing the intervals between four adjacent original pixels, as shown in FIG. 13. In this case, a region 100 surrounded by four adjacent original pixels $p(i,j)$ to $p(i+1,j+1)$ deviates from an interpolation position range 101 which uses these four original pixels for interpolation operation.

For this reason, e.g., an interpolation position $P(x,y)$ uses farther original pixels $p(i+1,j)$ and $p(i+1,j+1)$ for interpolation operation instead of original pixels $p(i-1,j)$ and $p(i-1,j+1)$ nearer the interpolation position. Depending on an original pixel value, a large error occurs in a pixel value obtained by interpolation operation. To solve this, an offset must be added (or subtracted) every calculation of an interpolation position, increasing the operation amount.

SUMMARY OF THE INVENTION

The present invention has been made to overcome the conventional drawbacks, and has as its object to provide an image processing method and apparatus capable of performing image processing such as enlargement/reduction for an original image at high speed and high quality without calculating an interpolation coefficient at each interpolation position or increasing the circuit scale even with the demand for high precision.

To achieve the above object, according to the present invention, there is provided an image processing method of calculating, for an original image formed from a plurality of original pixels arrayed in a matrix along X- and Y-coordinate axes perpendicular to each other, a new pixel value at a desired pixel position by interpolation operation using pixel values of interpolation original pixels formed from a plurality of original pixels within a predetermined range from the desired pixel position, and interpolation coefficients corresponding to the interpolation original pixels, thereby generating a new image obtained by image-processing the original image, comprising equally dividing a square submatrix formed from 2×2 adjacent original pixels into small square regions along the X- and Y-coordinate axes, setting approximate points at vertexes of the regions, deriving, on the basis of a predetermined interpolation function, interpolation coefficients discretized at approximate points within a predetermined range centered on an arbitrary approximate point, calculating interpolation coefficients normalized so as to adjust a sum of coefficient values of interpolation coefficients used for one interpolation operation among the interpolation coefficients to $2^k$ (k is a positive integer), and storing the normalized interpolation coefficients in a coefficient buffer in advance, temporarily storing an input original image in an original image buffer, calculating a new pixel position of each pixel constituting a new image in accordance with magnifications representing enlargement/reduction ratios along the X- and Y-coordinate axes for the original image, selecting an approximate point closest to the new pixel position as an approximate point of the new pixel position from approximate points in a submatrix to which the new pixel position belongs, reading out interpolation coefficients corresponding to the interpolation original pixels from the coefficient buffer on the basis of positional relationships between the selected approximate point and interpolation original pixels within a predetermined range from the approximate point, performing interpolation operation by product-sum operation between the pixel value of each interpolation original pixel read out from the original image buffer and each interpolation coefficient read out from the coefficient buffer, thereby calculating a pixel value at the approximate point, and dividing the calculated pixel value by $2^k$ to output a pixel value at the new pixel position.

BRIEF DESCRIPTION OF THE DRAWINGS

FIG. 7 is a table showing an example of interpolation coefficient selection processing using approximation processing;

FIG. 8 is a table showing a normalization example of an interpolation coefficient;

DESCRIPTION OF THE PREFERRED EMBODIMENT

An embodiment of the present invention will be described with reference to the accompanying drawings.

Figure 1:
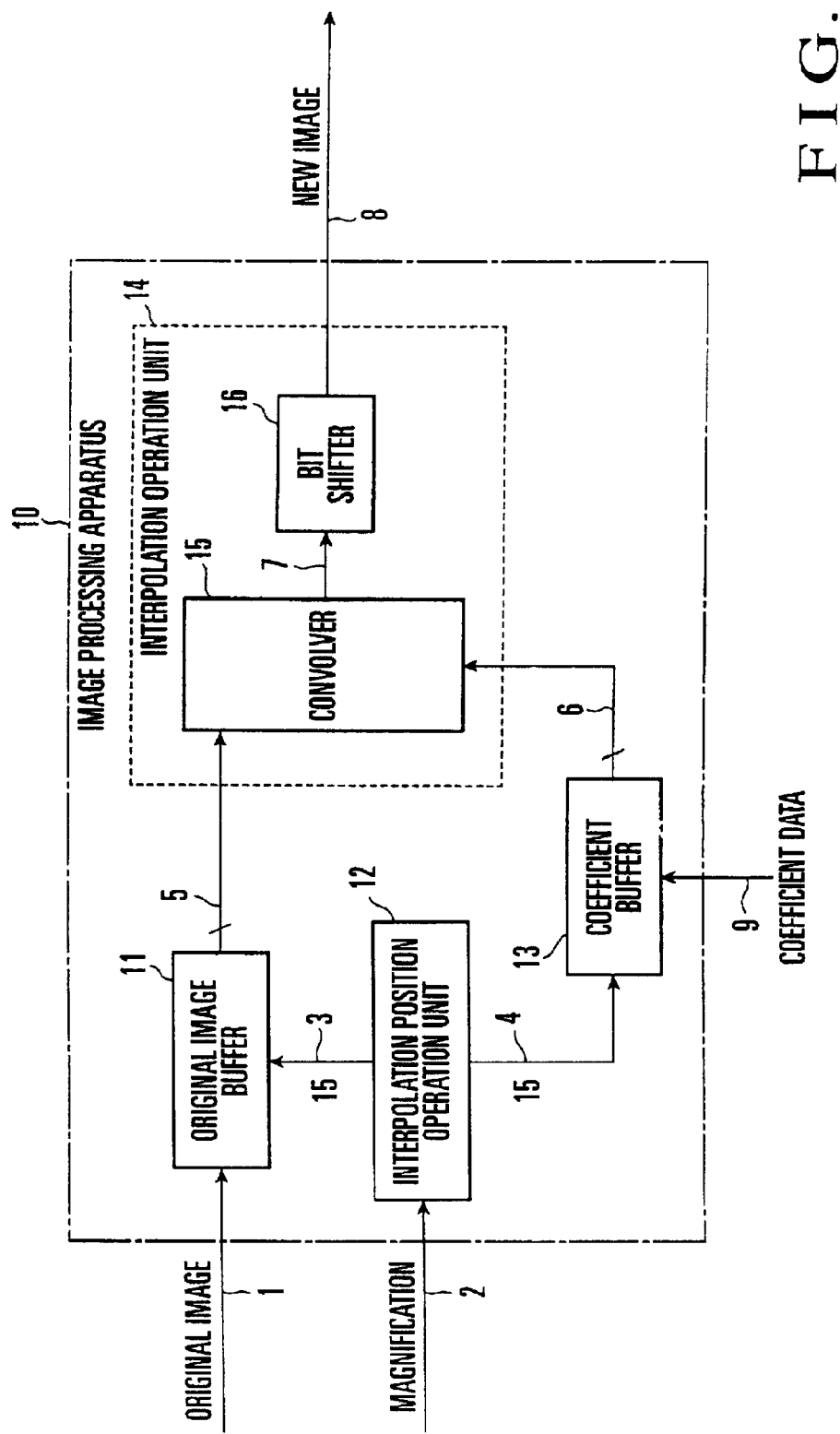
FIG. 1 is a block diagram showing an image processing apparatus according to an embodiment of the present invention.

FIG. 1 shows an image processing apparatus according to the embodiment of the present invention. An image processing apparatus 10 outputs a new image 8 by executing image processing for a two-dimensional original image 1 sensed by an image sensing apparatus such as an electronic camera, on the basis of a magnification 2 representing an enlargement/reduction ratio along the X- and Y-coordinate axes of the original image 1 that are perpendicular to each other.

The image processing apparatus 10 comprises an original image buffer 11, interpolation position operation unit 12, coefficient buffer 13, and interpolation operation unit 14.

Based on the designated magnification 2, the interpolation position operation unit 12 calculates a new pixel position, i.e., interpolation position of each pixel constituting the new image 8.

The original image buffer 11 receives the original image 1 to be processed, and temporarily stores it. The original image buffer 11 selectively outputs an original pixel, i.e., interpolation original pixel used to calculate a new pixel value at an interpolation position, on the basis of integral parts 3 of X- and Y-coordinate values representing the interpolation position calculated by the interpolation position operation unit 12.

The coefficient buffer 13 stores pre-input coefficient data 9 as an interpolation coefficient corresponding to each interpolation original pixel in accordance with the positional relationship between an interpolation position and an interpolation original pixel. The coefficient buffer 13 selectively outputs an interpolation coefficient 6 corresponding to the interpolation original pixel on the basis of decimal parts 4 of the X- and Y-coordinate values representing the interpolation position calculated by the interpolation position operation unit 12.

The interpolation operation unit 14 includes a convolver (product-sum operation unit) 15 and bit shifter 16.

The convolver 15 calculates a pixel value 7 at the interpolation position by performing product-sum operation while making the pixel value of an interpolation original pixel 5 selectively output from the original image buffer 11 correspond to the interpolation coefficient 6 selectively output from the coefficient buffer 13.

The bit shifter 16 executes division by bit-shifting the pixel value 7 calculated by the convolver 15 to a lower-bit direction. The bit shifter 16 outputs the obtained pixel value as a new pixel value at the interpolation position. As a result, a new image 8 is generated by image processing of the original image 1 at the magnification 2.

Figure 2:
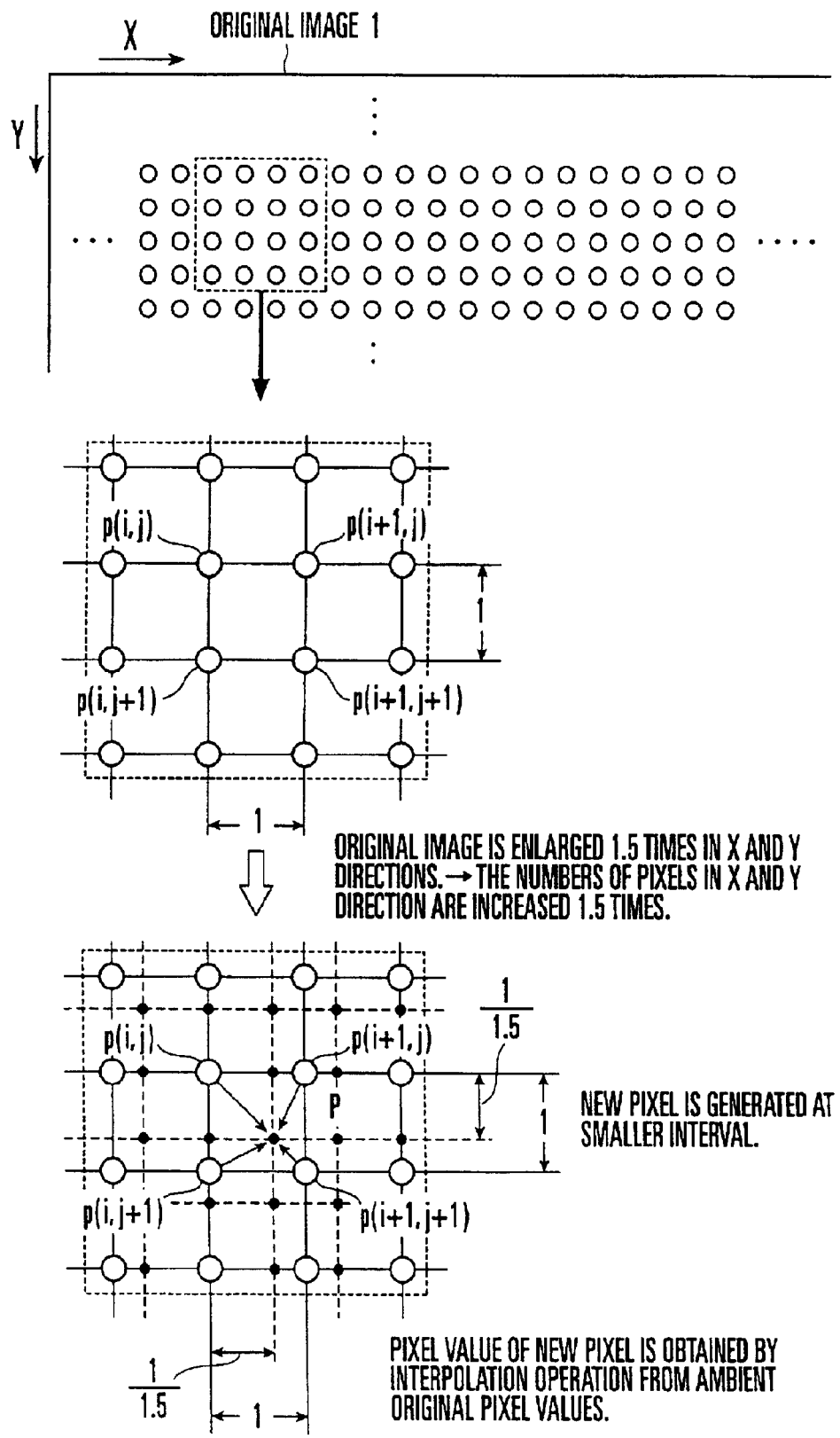
FIG. 2 is a view showing enlargement processing.

Image processing using interpolation operation will be generally described by exemplifying image enlargement processing with reference to FIG. 2. FIG. 2 shows enlargement processing.

The original image 1 is made up of a plurality of original pixels arrayed in a matrix along the X- and Y-coordinate axes. Assume that the logical distances between four adjacent original pixels $p(i,j)$, $p(i,j+1)$, $p(i+1,j)$, and $p(i+1,j+1)$ are "1".

Processing of enlarging the original image 1 by 1.5 times along the X- and Y-coordinate axes is identical to processing of increasing the number of pixels by 1.5 times along the X- and Y-coordinate axes. Hence, the Interval between pixels constituting a new image becomes narrower by 1/1.5. A pixel value at a new pixel position where no original pixel exists, for example, at a point P is required.

The pixel value of a new pixel position, i.e., interpolation position is calculated by interpolation operation using the pixel values of interpolation original pixels falling within a predetermined distance range from the interpolation position. For example, the pixel value at the point P in FIG. 2 may be calculated from four interpolation original pixels $p(i,j)$, $p(i,j+1)$, $p(i+1,j)$, and $p(i+1,j+1)$ surrounding the point P.

In this embodiment, interpolation is done using interpolation original pixels identical in number in two directions along the X-coordinate axis from the interpolation position P. This also applies to the Y-coordinate axis. Letting m (m is a positive integer) be the number of interpolation original pixels in one direction from the interpolation position P, one interpolation operation uses $4 \ m^2$ interpolation original pixels. The above example adopts m=1.

Assuming that the distances between original pixels adjacent along the X- and Y-coordinate axes are "1", and the magnifications along the X- and Y-coordinate axes are Ex and Ey, coordinate values Px and Py at the interpolation position P are given by $$Px=q/Ex,\ Py=q/Ey$$

where Q is an integer of 0 or more.

If Px and Py are expressed by "X.x" and "Y.y", the integral parts "x" and "Y" correspond to the coordinate values i and j of $p(i,j)$ because of the distance "1" between original pixels, and the decimal parts "x" and "y" correspond to coordinate values from $p(i,j)$ to the interpolation position P.

From this, the interpolation position operation unit 12 in FIG. 1 calculates a new pixel position, i.e., interpolation position of each pixel constituting the new image 8 on the basis of the designated magnification 2. The interpolation position operation unit 12 specifies the original pixel $p(i,j)$ based on the integral parts "X" and "Y". Further, the interpolation position operation unit 12 selects each interpolation original pixel used for interpolation operation for the interpolation position P by using the original pixel $p(i,j)$ as a reference.

More specifically, letting m be the number of interpolation original pixels in one direction, all original pixels within a square region surrounded by p(i−m+1,j−m+1), p(i−m+1,j+m), p(i+m,j−m+1), and p(i+m,j+m) are selected as interpolation original pixels.

Figure 3:
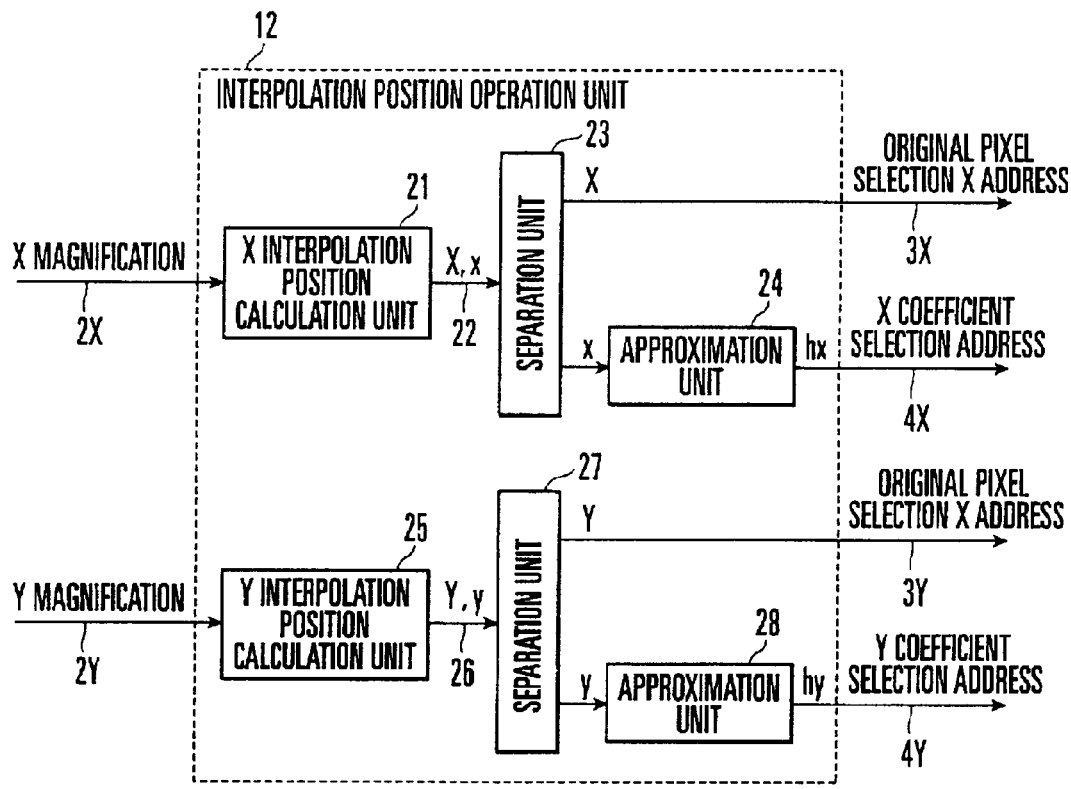
FIG. 3 is a block diagram showing an arrangement of an interpolation position operation unit.

FIG. 3 shows an arrangement of the interpolation position operation unit. The interpolation position operation unit 12 comprises an X interpolation position calculation unit 21, separation unit 23, approximation unit 24, Y interpolation position calculation unit 25, separation unit 27, and approximation unit 28.

The X interpolation position calculation unit 21 calculates an X-coordinate value 22 representing a new pixel position, i.e., interpolation position of each pixel constituting the new image 8 on the basis of a magnification along the X-coordinate axis, i.e., an X magnification 2X. The separation unit 23 separates the X-coordinate value 22 expressed by a real number "X.x" into the integral part "X" and decimal part "x". The integral part "X" is used as an original pixel selection address 3X to select an interpolation original pixel from the original image buffer 11.

Similarly, the Y interpolation position calculation unit 25 calculates a Y-coordinate value 26 representing an interpolation position on the basis of a Y magnification 2Y representing a magnification along the Y-coordinate axis.

The separation unit 27 separates the Y-coordinate value 26 expressed by a real number "Y.y" into the integral part "Y" and decimal part "y". The integral part "Y" is used as an original pixel selection address 3Y to select an interpolation original pixel from the original image buffer 11.

The decimal parts "x" and "y" of the coordinate values representing the interpolation position correspond to coordinate values, i.e., distances from p(i,j) to the interpolation position P. Based on these decimal parts, an interpolation coefficient corresponding to each interpolation pixel value can be specified.

Figure 4:
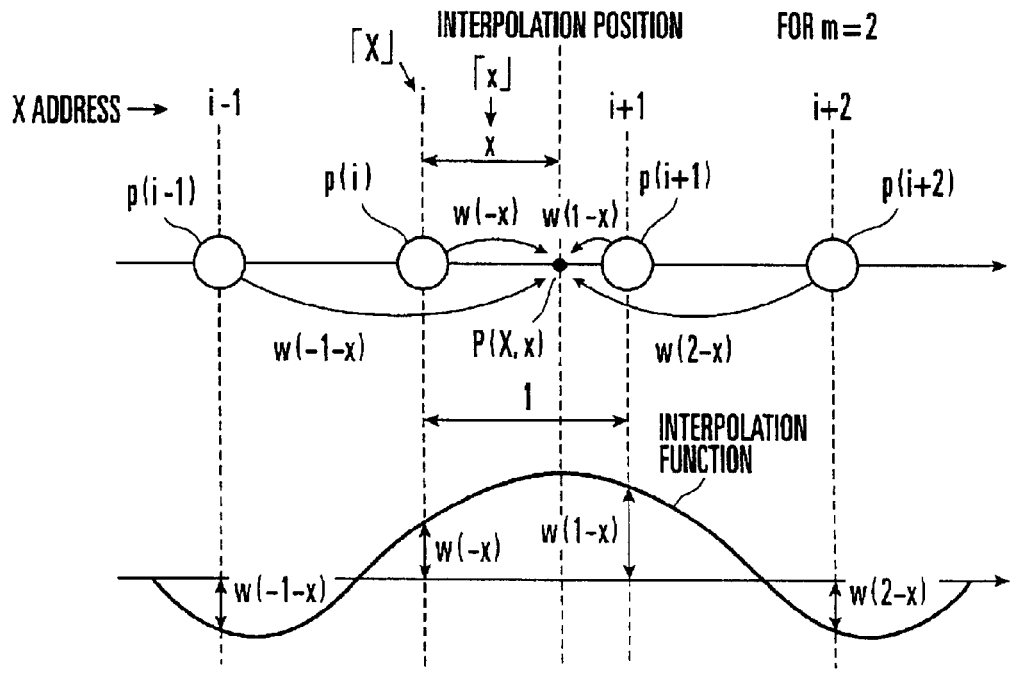
FIG. 4 is a view showing an example of interpolation coefficient selection processing.

FIG. 4 shows an example of interpolation coefficient selection processing. For easy understanding, attention is paid to only the X-coordinate axis, exemplifying a case wherein the pixel value of the interpolation position P is obtained using four original pixels p(i−1), p(i), p(i+1), and p(i+2) aligned along the X-coordinate axis.

The interpolation position P is located between the original pixels p(i) and p(i+1). If the X-coordinate value of the interpolation position P is a real number "X.x", the integral part "X" corresponds to the coordinate value i of the original pixel p(i), and the decimal part "x" corresponds to a distance x from p(i) to the interpolation position P, as described above.

The interpolation coefficient is a weight to the pixel value of each interpolation original pixel used for interpolation operation. In general, the interpolation coefficient changes depending on the position relationship between each interpolation original pixel and an interpolation position. The interpolation coefficient is expressed by a function using the positional relationship as a parameter, i.e., an interpolation function.

For example, the interpolation function in FIG. 4 has a characteristic horizontally symmetrical about the interpolation position P. This function employs as an interpolation coefficient a function value w corresponding to the positional relationship between the interpolation position P and an interpolation original pixel.

When the interpolation position P is used as a reference, the relative coordinate values of the original pixels p(i−1), p(i), p(i+1), and p(i+2) are −1−x, −x, 1−x, and 2−x, and the interpolation coefficients of the respective original pixels can be expressed by w(−1−x), w(−x), w(1−x), and w(2−x).

Letting g(i−1), g(i), g(i+1), and g(i+2) be the pixel values of the original pixels p(i−1), p(i), p(i+1), and p(i+2), a pixel value G at the interpolation position P spaced apart a distance x from p(i) is given by $$G = \Sigma\{g(h) \times w(h-i-x)\}$$

where h is an integer of i−1 to i+2 (for m=2).

Letting m be the number of interpolation original pixels on one direction from the interpolation position P, h is an integer of i−m+1 to i+m.

Figure 5:
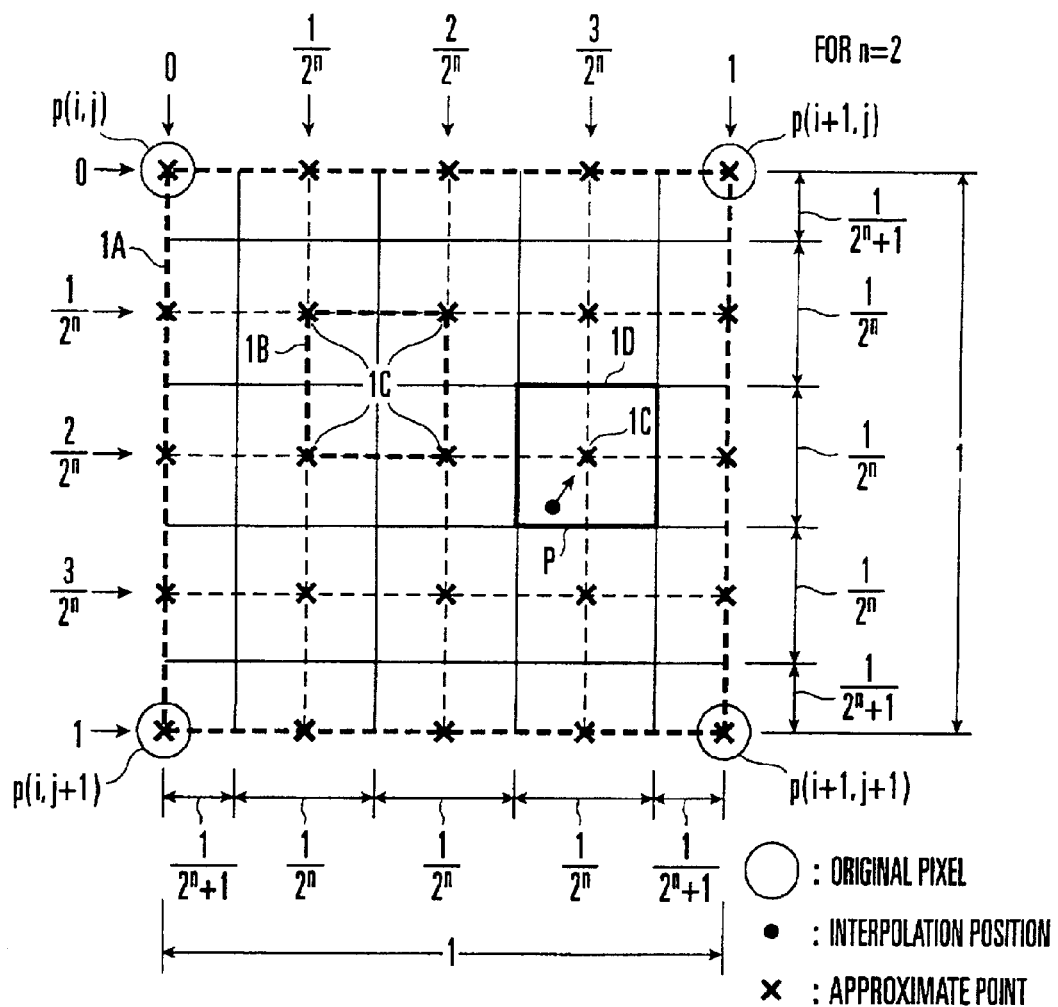
FIG. 5 is a view showing approximation processing of an interpolation position.

FIG. 5 shows approximation processing for an interpolation position. In FIG. 5, a submatrix 1A made up of original pixels p(i,j), p(i+1,j), p(i,j+1), and p(i+1,j+1) is equally divided by $2^n$ (n is an integer of 2 or more) along the X- and Y-coordinate axes to generate $2^{n+1}$ square regions 1B. Approximate points 1C are set at the vertexes of each region 1B. An interpolation position within an approximate range 1D is approximated to an approximate point at the center. For example, for n=2, the submatrix 1A is equally divided into 16 regions, and 20 approximate points 1C are set. The interpolation position P is approximated to an approximate point 1C at the center of the approximate range 1D which includes the interpolation position P.

Approximation processing for the decimal parts of coordinate values representing an interpolation position is executed by the approximation units 24 and 28 of the interpolation position operation unit 12 in FIG. 3.

More specifically, the decimal part "x" of the X-coordinate value 22 separated by the separation unit 23 undergoes approximation processing by the approximation unit 24, and used as an X coefficient selection address 4X for selection of an interpolation coefficient from the coefficient buffer 13. The decimal part "y" of the Y-coordinate value 26 separated by the separation unit 27 undergoes approximation processing by the approximation unit 28, and used as a Y coefficient selection address 4Y for selection of an interpolation coefficient from the coefficient buffer 13.

Figure 6:
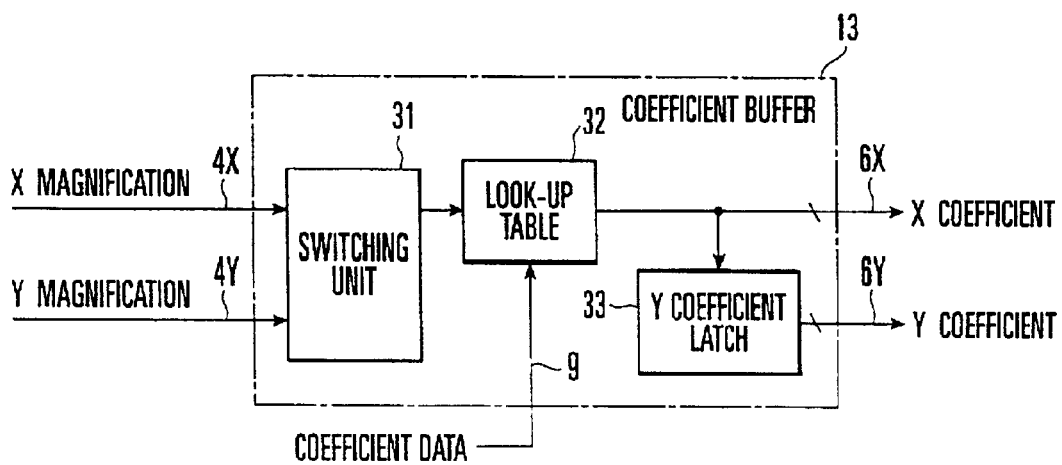
FIG. 6 is a block diagram showing an arrangement of a coefficient buffer.

The coefficient buffer 13 selects an interpolation coefficient corresponding to each interpolation original pixel on the basis of the X coefficient selection address 4X and Y coefficient selection address 4Y. FIG. 6 shows an arrangement of the coefficient buffer 13.

The coefficient buffer 13 comprises a switching unit 31, look-up table (LUT) 32, and Y coefficient latch 33.

The switching unit 31 selects either one of the X coefficient selection address 4X and Y coefficient selection address 4Y. The look-up table 32 holds in advance the coefficient data 9 formed from an interpolation coefficient corresponding to the distance between an interpolation position and an interpolation original pixel. An interpolation coefficient corresponding to each interpolation original pixel is selected and read based on an address selected by the switching unit 31.

The switching unit 31 is switched upon a change in the Y-coordinate value of an interpolation position calculated by the interpolation position operation unit 12.

The interpolation position operation unit 12 sequentially calculates interpolation positions in the X-coordinate direction for the uppermost one of pixel lines constituting a new image. After calculating interpolation positions for a desired number of pixels, the target line is shifted by one pixel in the Y-coordinate direction, and the interpolation position operation unit 12 sequentially calculates interpolation positions in the X-coordinate direction. This is sequentially repeated to the lowermost line, calculating respective pixels, i.e., interpolation positions constituting the new image.

A shift by one pixel in the Y-coordinate direction requires the Y-coordinate value of the shift destination. Thus, the switching unit 31 is switched to input the Y coefficient selection address 4Y to the look-up table 32, thereby obtaining a Y coefficient.

The Y coefficient latch 33 stores and holds an output from the look-up table 32 only when the switching unit 31 selects the Y coefficient selection address 4Y.

While the switching unit 31 selects the X coefficient selection address 4X, the look-up table 32 outputs an X coefficient 6X. At the same time, the Y coefficient latch 33 outputs a Y coefficient 6Y.

FIG. 7 shows interpolation coefficient selection processing using approximation processing. FIG. 7 shows interpolation coefficient selection processing when the switching unit 31 selects an X coefficient selection address. The same processing is also applied to a case wherein the switching unit 31 selects a Y coefficient selection address.

As shown in FIG. 3, approximation processing is done using the decimal parts of the X-coordinate value 22 and Y-coordinate value 26. Thus, the range of an interpolation position approximated to each approximate point 1C (see FIG. 5) is limited to the inside of the submatrix 1A.

Figure 13:
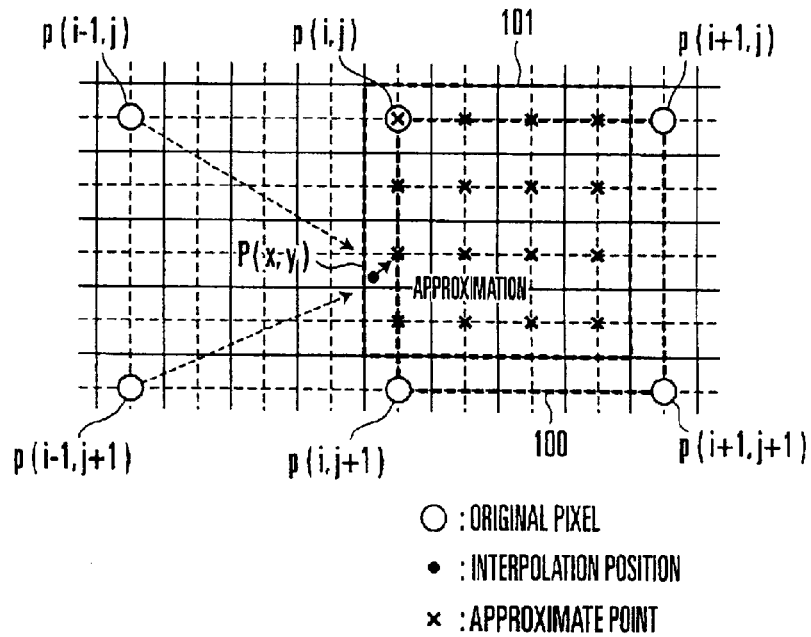
FIG. 13 is a view showing an approximation processing example in a conventional image processing apparatus.

Compared to setting of a conventional approximate range shown in FIG. 13, no deviation occurs between the approximate range and the interpolation original pixel, suppressing a pixel value error caused by the deviation. Accordingly, a redundant operation amount can be reduced without adding (or subtracting) an offset every calculation of an interpolation position.

The interpolation function suffices to adopt a desired characteristic. For example, for linear interpolation using two interpolation pixels p(i) and p(i+1) which sandwich the interpolation position P, letting d be the relative distance of the interpolation original pixel p(i) to the interpolation position P, an interpolation coefficient w at p(i) and p(i+1) is given by For $0 \leq d < 1$ $w = 1 - d$ and $w = d$ The interpolation coefficient w corresponding to an interpolation original pixel may be calculated by the following equation in consideration of an enhancement coefficient a representing the degree of enhancement/attenuation at high spatial frequency for an enlarged/reduced image:

For $0 \leq d < 1$, $w = (a+2)d^3 + (a+3)d^2 + 1$

For $1 \leq d < 2$, $w = ad^3 + 5ad^2 + 8ad - 4a$ where d is the absolute value of the distance from the interpolation position P to the interpolation original pixel, and a is the enhancement coefficient.

Since the calculated interpolation coefficient is a real number, high-precision interpolation operation (product-sum operation) requires floating-point operation. The number of significant figures must correspond to the obtained coefficient value.

Even if the number of approximate points for interpolation points is increased to reduce approximation errors, the number of significant digit positions must be increased. This is because the increase in approximate points is ineffective unless the number of significant figures is increased.

As a method of solving this problem, normalization of an interpolation coefficient is taken into consideration. FIG. 8 shows a normalization example of an interpolation coefficient.

As shown in FIG. 8, each interpolation coefficient w is multiplied by a predetermined normalization coefficient and normalized to a normalized interpolation coefficient W. This decreases the number of digit positions at the decimal part. Fixed-point operation lower in processing load than floating-point operation can be employed. In addition, the number of significant digit positions can be decreased.

The coefficient buffer 13 stores, as an interpolation coefficient, the coefficient data 9 normalized in advance.

The interpolation operation unit 14 in FIG. 1 calculates a new pixel value 7 at the pixel value 7 by performing product-sum operation by the convolver 15 using each interpolation original pixel selected in accordance with the interpolation position P and a corresponding interpolation coefficient.

At this time, the convolver 15 receives the X coefficient 6X and Y coefficient 6Y from the coefficient buffer 13. For each interpolation original pixel, the convolver 15 adds the pixel value of the interpolation original pixel and the corresponding X coefficient 6X and Y coefficient 6Y, and outputs the sum as the pixel value 7.

When the interpolation coefficient is one multiplied by a normalization coefficient, the pixel value 7 by product-sum operation is a value calculated by multiplying an actual pixel value by a given constant. In this case, the gain may be adjusted in interpolation operation. However, every gain adjustment requires addition of interpolation coefficients and division using the sum.

To prevent this, the sum of interpolation coefficients is adjusted to be equal to a normalization coefficient for interpolation coefficients present every $2^n$ pixels represented by sets A to D in FIG. 8, i.e., interpolation coefficients used for one interpolation operation.

The use of the normalized interpolation coefficient can simplify interpolation operation. In other words, the product-sum operation result of each interpolation original pixel value and each interpolation coefficient determined by the relative positions of the interpolation original pixel and interpolation point is divided by a normalization coefficient.

In this embodiment, the interpolation coefficient is normalized such that the sum of the coefficient values of interpolation coefficients used for one interpolation operation is adjusted to $2^k$ (k is a positive integer). Accordingly, the coefficient increases, and the decimal part decreases. A fixed-point operation unit can be adopted, and the convolver 15 can be greatly simplified. Since each interpolation coefficient is normalized in advance using the normalization coefficient $2^k$, division in the bit shifter 16 can be executed by the same shift operation regardless of which coefficient is selected.

Arithmetic processing of dividing the pixel value 7 can be realized by an arithmetic function, i.e., the bit shifter 16 of shifting the bits of the pixel value 7 by k bits in a lower-bit direction. The pixel value 7 can be divided within a shorter time in comparison with floating-point operation. Further, this can be implemented by only wiring for a device which assumes always using the same normalization coefficient.

In this manner, the interpolation position is approximated to an approximate point, and the sum of interpolation coefficients is normalized to $2^k$. Even if a two-dimensional image is enlarged/reduced by high-order interpolation, and thus the number of original pixels used for interpolation operation is increased, high-speed processing can be achieved without complicating operation or increasing the circuit scale.

Since high-order interpolation can be easily executed, no alias occurs, unlike reduction by, e.g., simple thinning. A high spatial frequency can also be easily enhanced in enlargement without blurring an image, unlike in enlargement by simple interpolation.

The same original pixel is used for interpolation operation within a range surrounded by original pixels. Compared to the prior art (see FIG. 13), calculation of an approximate point can simply use a decimal part of an interpolation position. Moreover, this operation is compatible with hardware, reducing the circuit scale.

Normalization of the interpolation coefficient decreases the number of digit positions at the decimal part, and may use an integerized interpolation coefficient Wi prepared by integerizing the coefficient value of each normalized interpolation coefficient, as shown in FIG. 8. As integerization, rounding processing to an integer (e.g., round-off processing) is done.

If the sum of integerized interpolation coefficients does not become $2^k$ owing to rounding processing to an integer, a gain is applied to an interpolated pixel value. Depending on a pixel position, the brightness of an interpolated image changes (e.g., a uniform image changes to a nonuniform one).

To prevent this, any of interpolation coefficients before integerization is selected and incremented/decremented, thereby incrementing/decrementing the integerized interpolation coefficient by "1". Interpolation coefficients are sequentially selected and incremented/decremented until the sum of integerized interpolation coefficients becomes $2^k$.

Interpolation coefficients to be incremented/decremented are sequentially selected from one having the lowest increment/decrement ratio. This can minimize an error between interpolation coefficients before and after integerization.

Integerization processing generates a small error, which depends on the number of digital positions used in operation. As long as the number of digital positions necessary for a coefficient value is the same, fixed-point operation greatly facilitates hardware and software operations in comparison with floating-point operation.

The CPU (Central Processing Unit) regards the number of digit positions of an interpolation coefficient as the number of bits. With fixed-point operation by normalization and integerization, high-speed software operation can also be realized using a general-purpose processor. In the design of an optimal processor (hardware), its circuit scale can be greatly reduced.

Integerized interpolation coefficients may be set symmetrical about an interpolation position, as shown in FIG. 8. That is, interpolation coefficients on one side with respect to an interpolation position (approximate point) are selected from one-side interpolation coefficients stored in the coefficient buffer 13, in accordance with the positional relationship between the interpolation position and the interpolation coefficients. Interpolation coefficients on the opposite side are selected from those stored in the coefficient buffer in accordance with positional relationships obtained by sign-inverting the positional relationship between the interpolation position and the interpolation coefficients.

Interpolation coefficients on the opposite side can be selected from those on one side with respect to the interpolation position. The number of interpolation coefficients stored in the look-up table can be decreased to almost half, remarkably reducing the storage capacity necessary for the look-up table.

As shown in FIG. 6, the single look-up table 32 is used for the X- and Y-coordinate axes. An interpolation coefficient at a two-dimensional approximate coefficient is calculated by multiplying, by the convolver 15, X and Y coefficients obtained by looking up the table for the X- and Y-coordinate axes. The look-up table can be greatly downsized, compared to a case wherein all interpolation coefficients are stored for two-dimensional approximate points.

Even if the precision is improved by setting finer approximate points and increasing the number of original pixels used for interpolation, calculation can be achieved without greatly increasing the number of data stored in the look-up table.

When the interpolation position operation unit 12 successively calculates X-coordinate values along the X-coordinate axis for an interpolation position, the Y-coordinate value holds the same coefficient value until the end of one line. Hence, the Y-coordinate value need not be calculated or the table need not be looked up every time the X-coordinate value changes. By latching the Y coefficient value by the Y coefficient latch 33, as shown in FIG. 6, the share of the same interpolation coefficient in the X- and Y-coordinate directions hardly influences the operation speed.

Figure 9:
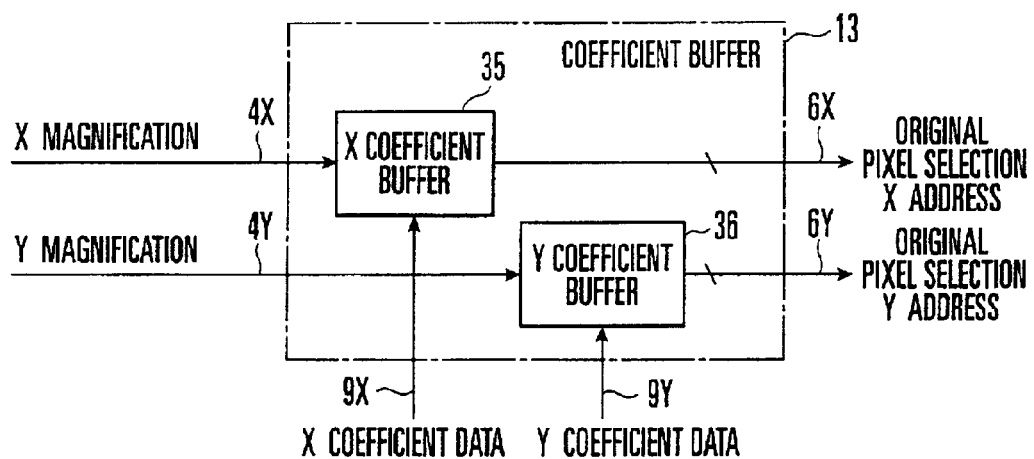
FIG. 9 is a block diagram showing another arrangement of the coefficient buffer.

The coefficient buffer 13 may use different coefficient data for X and Y coefficients, as shown in FIG. 9. FIG. 9 shows another arrangement of the coefficient buffer.

This coefficient buffer 13 comprises an X coefficient buffer 35 which stores X coefficient data 9X along the X-axis, and a Y coefficient buffer 36 which stores Y coefficient data 9Y along the Y-axis. The X coefficient buffer 35 receives the X coefficient selection address 4X from the interpolation position operation unit 12, and outputs the X coefficient 6X. The Y coefficient buffer 36 receives the Y coefficient selection address 4Y from the interpolation position operation unit 12, and outputs the Y coefficient 6Y.

The X and Y coefficient buffers independently arranged in the coefficient buffer 13 enable changing the aspect ratio of the original image 1 and changing the number of pixels in accordance with the characteristics of a display system.

When the interpolation position P coincides with an original pixel position, as shown in FIG. 8, an interpolation coefficient with which all interpolation coefficients corresponding to other interpolation original pixels become "0" is used. If the interpolation position P is near an original pixel position, for example, even if interpolation positions P sandwich the same original pixel and sets of 2m interpolation original pixels used for interpolation operation at the two interpolation positions are different, no difference is generated in new pixel values at the two interpolation positions, or no discontinuity of pixel values on a new image appears.

As for the number of interpolation coefficients, the coefficient values of interpolation coefficients at two ends are always "0" from the above theory. These values are not stored as coefficients, further reducing the memory size of the interpolation coefficient table.

The coefficient data 9 may be rewritten in accordance with an original image or a desired enlarged/reduced image.

If coefficient buffers are set independently for the X- and Y-coordinate axes, as shown in FIG. 9, different characteristics may be applied to the X- and Y-coordinate axes. For the horizontal direction (X-coordinate axis) in which resolving power is high due to the human visual sense, an interpolation coefficient with a characteristic which enhances a high spatial frequency range can be utilized.

Figure 10:
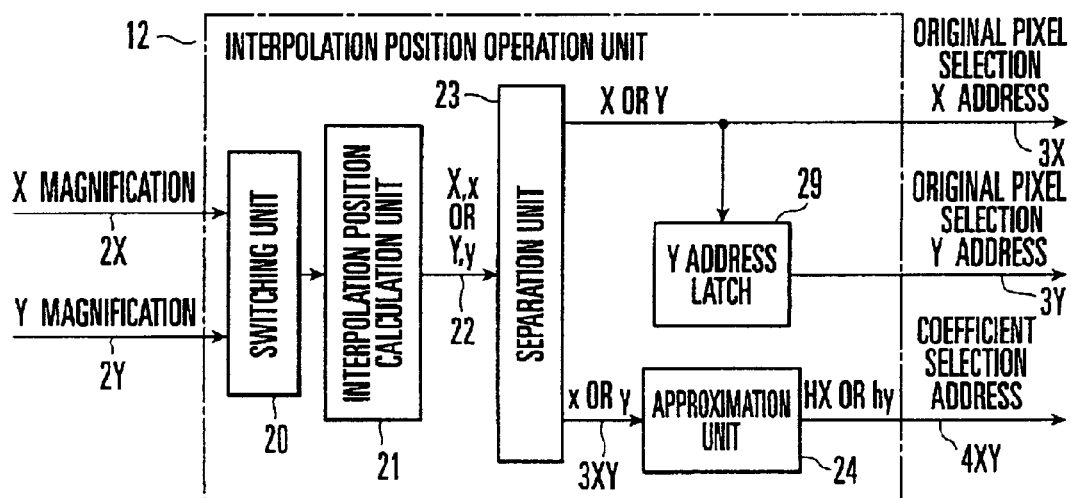
FIG. 10 is a block diagram showing another arrangement of the interpolation position operation unit.

In FIG. 6, the look-up table 32 is shared as the coefficient buffer 13 between the X- and Y-coordinate axes. Also in the interpolation position operation unit 12, the interpolation position calculation unit 21 and other units can be shared between the X- and Y-coordinate axes, as shown in FIG. 10. In FIG. 10, a switching unit 20 is connected to the input side of the interpolation position calculation unit 21 to select either one of an X magnification 2X and Y magnification 2Y. When the X magnification 2X is selected, the interpolation calculation unit 21 calculates an interpolation position along the X-coordinate axis, as described above (see FIG. 3). The integral part of the interpolation position is output as an original pixel selection address 3X from the separation unit 23. The decimal part is approximated by the approximation unit 24, which outputs a coefficient selection address 4XY representing an address along the X-coordinate axis.

A shift in the Y-coordinate direction by one pixel requires a Y-coordinate value at the shift destination, so that the switching unit 20 is switched to select the Y magnification 2Y. The interpolation calculation unit 21 calculates an interpolation position along the Y-coordinate axis. The integral part separated by the separation unit 23 is latched by a Y address latch 29, and output as an original pixel selection address 3Y. The decimal part is approximated by the approximation unit 24, which outputs a coefficient selection address 4XY representing an address along the Y-coordinate axis. In this way, the interpolation position calculation unit 21 and other units can be shared between the X- and Y-coordinate axes in the interpolation position operation unit 12, reducing the circuit scale.

Figure 11:
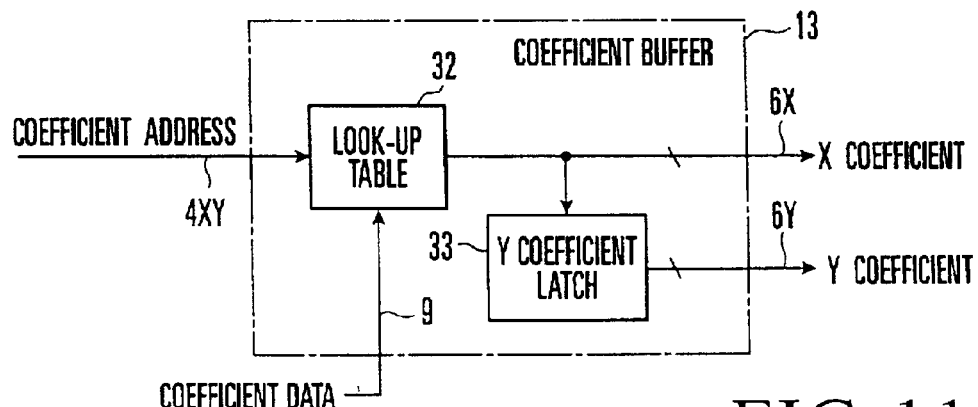
FIG. 11 is a block diagram showing still another arrangement of the coefficient buffer.

The interpolation position operation unit 12 in FIG. 10 selectively outputs the coefficient selection addresses 4XY along the X- and Y-coordinate axes by using the same signal line. Hence, the switching unit 31 in FIG. 6 can be eliminated from the coefficient buffer 13. This results in an arrangement as shown in FIG. 11 with a smaller circuit scale.

Figure 12:
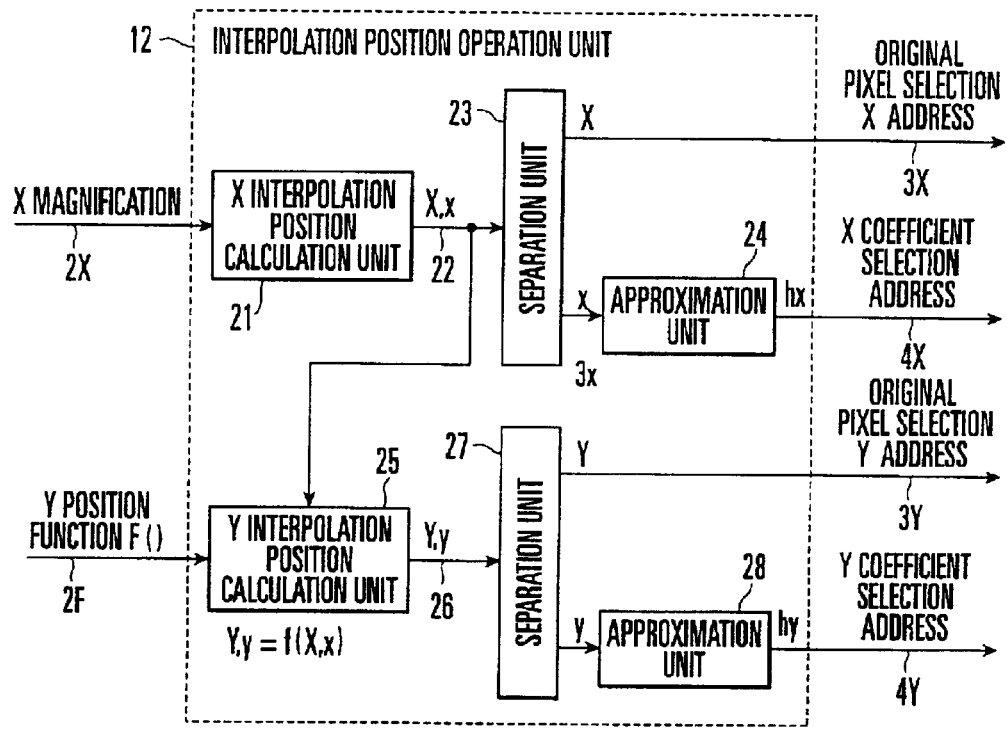
FIG. 12 is a block diagram showing still another arrangement of the interpolation position operation unit.

If a Y-coordinate value at an interpolation position can be calculated from a function using the X-coordinate value as a parameter, as shown in FIG. 12, an image can be not only enlarged/reduced but also rotated. FIG. 12 shows another arrangement of the interpolation position operation unit.

In FIG. 12, the Y interpolation position calculation unit 25 calculates the Y-coordinate value 26 at the interpolation position by using the X-coordinate value 22 at the interpolation position that is calculated by the X interpolation position calculation unit 21, and a preset Y position function 2F:

$$Y.y=f(X.x)$$

This image conversion only slightly complicates the operation of the Y interpolation position calculation unit 25 in terms of the apparatus arrangement. The use of a slightly complex function enables various image deformations. For example, by rewriting the function every line (or every several lines) of an output image, the strain of an optical system such as a lens can be corrected.

In addition, the magnification can also be switched during image processing. A plurality of magnifications may be internally stored and switched. A combination of these processes allows obtaining a partially enlarged output image.

As has been described above, according to the present invention, a square submatrix made up of 2×2 adjacent original pixels is equally divided into small square regions along the X- and Y-coordinate axes. Approximate points are set at the vertexes of the regions. Interpolation coefficients discretized at approximate points within a predetermined range centered at an arbitrary approximate point are derived based on a predetermined interpolation function. Interpolation coefficients normalized such that the sum of the coefficient values of interpolation coefficients used for one interpolation operation among the interpolation coefficients becomes $2^k$ (k is a positive integer) are calculated and stored in the coefficient buffer. An input original image is temporarily stored in the original image buffer. A new pixel position of each pixel constituting a new image is calculated in accordance with magnifications representing enlargement/reduction ratios along the X- and Y-coordinate axes for the original image. An approximate point closest to the new pixel position is selected as the approximate point of the new pixel position from approximate points in a submatrix to which the new pixel position belongs. Interpolation coefficients corresponding to the interpolation original pixels are read out from the coefficient buffer on the basis of the positional relationships between the selected approximate point and interpolation original pixels within a predetermined range from the approximate point. A pixel value at the approximate value is calculated by performing interpolation operation by product-sum operation between the pixel value of each interpolation original pixel read out from the original image buffer and each interpolation coefficient read out from the coefficient buffer. The calculated pixel value is divided by $2^k$, and the result is output as a pixel value at the new pixel position.

Hence, image processing such as enlargement/reduction of an original image can be achieved at high speed and high quality without calculating an interpolation coefficient for each interpolation position or increasing the circuit scale even with the demand for high precision, unlike the prior art. Approximation of an interpolation position to an approximate point does not cause any deviation between original pixels around the interpolation position and interpolation original pixels used for interpolation operation. An error of the pixel value caused by the deviation can be suppressed, realizing high-precision interpolation processing.

What is claimed is:

1. An image processing method of calculating, for an original image formed from a plurality of original pixels arrayed in a matrix along X- and Y-coordinate axes perpendicular to each other, a new pixel value at a desired pixel position by interpolation operation using pixel values of interpolation original pixels formed from a plurality of original pixels within a predetermined range from the desired pixel position, and interpolation coefficients corresponding to the interpolation original pixels, thereby generating a new image obtained by image-processing the original image, comprising:

equally dividing a square submatrix formed from 2×2 adjacent original pixels into small square regions along the X- and Y-coordinate axes, setting approximate points at vertexes of the regions, deriving, on the basis of a predetermined interpolation function, interpolation coefficients discretized at approximate points within a predetermined range centered on an arbitrary approximate point, calculating interpolation coefficients normalized so as to adjust a sum of coefficient values of interpolation coefficients used for one interpolation operation among the interpolation coefficients to $2^k$ (k is a positive integer), and storing the normalized interpolation coefficients in a coefficient buffer in advance;

temporarily storing an input original image in an original image buffer;

calculating a new pixel position of each pixel constituting a new image in accordance with magnifications representing enlargement/reduction ratios along the X- and Y-coordinate axes for the original image;

selecting an approximate point closest to the new pixel position as an approximate point of the new pixel position from approximate points in a submatrix to which the new pixel position belongs;

reading out interpolation coefficients corresponding to the interpolation original pixels from the coefficient buffer on the basis of positional relationships between the selected approximate point and interpolation original pixels within a predetermined range from the approximate point;

performing interpolation operation by product-sum operation between the pixel value of each interpolation original pixel read out from the original image buffer and each interpolation coefficient read out from the coefficient buffer, thereby calculating a pixel value at the approximate point; and dividing the calculated pixel value by $2^k$ to output a pixel value at the new pixel position.

2. A method according to claim 1, wherein when the interpolation coefficient to be stored in the coefficient buffer is to be normalized, each interpolation coefficient derived by a real number from the interpolation function is multiplied by $2^k$, and normalized to adjust a decimal part of a coefficient value of the interpolation coefficient to not more than a predetermined number of digit positions.

3. A method according to claim 1, wherein when the interpolation coefficient to be stored in the coefficient buffer is to be normalized, each interpolation coefficient derived by a real number from the interpolation function is multiplied by $2^k$, and integerized so as to integerize the interpolation coefficient.

4. A method according to claim 3, wherein when a sum of coefficient values of interpolation coefficients used for one interpolation operation among integerized interpolation coefficients does not become $2^k$ in integerizing interpolation coefficients to be stored in the coefficient buffer, one of the interpolation coefficients before integerization is incremented/decremented so as to adjust the sum to $2^k$, and interpolation coefficients are sequentially incremented/decremented from an interpolation coefficient having the lowest increment/decrement ratio.

5. A method according to claim 1, wherein a number used to divide the submatrix along the X- and Y-coordinate axes is $2^n$ (n is an integer of not less than 2).

6. A method according to claim 1, wherein the coefficient buffer stores interpolation coefficients corresponding to positional relationships along one of the X- and Y-coordinate axes in the positional relationships between the approximate point and the interpolation original pixels, and in interpolation operation, the interpolation coefficients along said one coordinate axis are shared between the X- and Y-coordinate axes, interpolation coefficients corresponding to the positional relationships between the approximate point and the interpolation original pixels along the X-coordinate axis are read out from the coefficient buffer, interpolation coefficients corresponding to the positional relationships between the approximate point and the interpolation original pixels along the Y-coordinate axis are read out from the coefficient buffer, and two interpolation coefficients along the X- and Y-coordinate axes for the same interpolation original pixel are accumulated to obtain an interpolation coefficient for each interpolation original pixel.

7. A method according to claim 1, wherein the coefficient buffer independently stores X interpolation coefficients corresponding to positional relationships along the X-coordinate axis, and X interpolation coefficients corresponding to positional relationships along the Y-coordinate axis in the positional relationships between the approximate point and the interpolation original pixels, and in interpolation operation, the interpolation coefficients corresponding to the positional relationships along the X-coordinate axis are read out from the coefficient buffer, the interpolation coefficients corresponding to the positional relationships along the Y-coordinate axis are read out from the coefficient buffer, and two interpolation coefficients along the X- and Y-coordinate axes for the same interpolation original pixel are accumulated to obtain an interpolation coefficient for each interpolation original pixel.

8. A method according to claim 1, wherein of interpolation coefficients calculated by a symmetrical interpolation function centered on the approximate point, only interpolation coefficients in one of directions from the approximate point are stored as interpolation coefficients to be stored in the coefficient buffer, and in interpolation operation, an interpolation coefficient in said one direction from the approximate point is selected from the interpolation coefficients in the coefficient buffer in accordance with a positional relationship between the approximate point and the interpolation coefficient, and an interpolation coefficient in a direction opposite to said one direction is selected from the interpolation coefficients in the coefficient buffer in accordance with a positional relationship obtained by sign-inverting the positional relationship between the approximate point and the interpolation coefficient.

9. A method according to claim 1, wherein when the approximate point coincides with a position of an arbitrary interpolation original pixel, an interpolation coefficient with which all interpolation coefficients corresponding to other interpolation original pixels become 0 is used as an interpolation coefficient to be stored in the coefficient buffer.

10. A method according to claim 1, wherein a reference original pixel serving a reference among four original pixels constituting a submatrix to which the approximate point belongs is specified on the basis of an integral part of a position of the approximate point obtained on the assumption that a distance between the original pixels is 1, and pixel values of interpolation original pixels used for one interpolation operation are read out from the coefficient buffer on the basis of the reference original pixel.

11. A method according to claim 10, wherein a positional relationship between the approximate point and the reference original pixel is calculated based on a decimal part of the position of the approximate point obtained on the assumption that the distance between the original pixels is 1, and coefficient values of interpolation coefficients used for one interpolation operation are read out from the coefficient buffer on the basis of the positional relationship.

12. A method according to claim 1, wherein in calculating a new pixel position of each pixel constituting a new image, a coordinate value of the new pixel position along one of X- and Y-coordinate axes is calculated in accordance with a magnification along said one coordinate axis, and a coordinate value of the new pixel position along the other coordinate axis is calculated by a predetermined function using the coordinate value along said one coordinate axis as a parameter.

13. An image processing apparatus for calculating, for an original image formed from a plurality of original pixels arrayed in a matrix along X- and Y-coordinate axes perpendicular to each other, a new pixel value at a desired pixel position by interpolation operation using pixel values of interpolation original pixels formed from a plurality of original pixels within a predetermined range from the desired pixel position, and interpolation coefficients corresponding to the interpolation original pixels, thereby generating a new image obtained by image-processing the original image, comprising:

a coefficient buffer for storing in advance interpolation coefficients calculated such that a square submatrix formed from 2×2 adjacent original pixels is equally divided into small square regions along the X- and Y-coordinate axes, approximate points are set at vertexes of the regions, interpolation coefficients discretized at approximate points within a predetermined range centered on an arbitrary approximate point are derived on the basis of a predetermined interpolation function, and the interpolation coefficients are normalized so as to adjust a sum of coefficient values of interpolation coefficients used for one interpolation operation among the interpolation coefficients to $2^k$ (k is a positive integer);

an original image buffer for temporarily storing an input original image;

interpolation position operation means for calculating a new pixel position of each pixel constituting a new image in accordance with magnifications representing enlargement/reduction ratios along the X- and Y-coordinate axes for the original image, selecting an approximate point closest to the new pixel position as an approximate point of the new pixel position from approximate points in a submatrix to which the new pixel position belongs, and reading out interpolation coefficients corresponding to the interpolation original pixels from said coefficient buffer on the basis of positional relationships between the selected approximate point and interpolation original pixels within a predetermined range from the approximate point; and interpolation operation means for performing interpolation operation by product-sum operation between the pixel value of each interpolation original pixel read out from said original image buffer and each interpolation coefficient read out from said coefficient buffer, thereby calculating a pixel value at the approximate point, and for dividing the calculated pixel value by $2^k$ to output a pixel value at the new pixel position.

14. An apparatus according to claim 13, wherein said coefficient buffer stores, in advance as the interpolation coefficient, an interpolation coefficient obtained by multiplying, by $2^k$, each interpolation coefficient derived by a real number from the interpolation function, and normalizing the interpolation coefficient so as to adjust a decimal part of a coefficient value of the interpolation coefficient to not more than a predetermined number of digit positions.

15. An apparatus according to claim 13, wherein said coefficient buffer stores, in advance as the interpolation coefficient, an interpolation coefficient obtained by multiplying, by $2^k$, each interpolation coefficient derived by a real number from the interpolation function, and integerizing the interpolation coefficient so as to integerize the interpolation coefficient.

16. An apparatus according to claim 15, wherein when a sum of coefficient values of interpolation coefficients used for one interpolation operation among normalized interpolation coefficients does not become $2^k$, said coefficient buffer stores, in advance as the interpolation coefficient, an interpolation coefficient obtained by incrementing/decrementing one of the interpolation coefficients before integerization so as to adjust the sum to $2^k$, and sequentially incrementing/decrementing interpolation coefficients from an interpolation coefficient having the lowest increment/decrement ratio.

17. An apparatus according to claim 13, wherein said coefficient buffer stores, in advance as the interpolation coefficient, an interpolation coefficient obtained by dividing the submatrix by $2^n$ (n is an integer of not less than 2) along the X- and Y-coordinate axes.

18. An apparatus according to claim 13, wherein said coefficient buffer stores, in advance as the interpolation coefficients, interpolation coefficients corresponding to positional relationships along one of the X- and Y-coordinate axes in the positional relationships between the approximate point and the interpolation original pixels, shares the interpolation coefficients along said one coordinate axis between the X- and Y-coordinate axes, outputs interpolation coefficients corresponding to the positional relationships between the approximate point and the interpolation original pixels along the X-coordinate axis, and outputs interpolation coefficients corresponding to the positional relationships between the approximate point and the interpolation original pixels along the Y-coordinate axis, and said interpolation operation unit accumulates two interpolation coefficients along the X- and Y-coordinate axes for the same interpolation original pixel, obtaining an interpolation coefficient for each interpolation original pixel.

19. An apparatus according to claim 13, wherein said coefficient buffer independently stores, in advance as the interpolation coefficients, X interpolation coefficients corresponding to positional relationships along the X-coordinate axis, and X interpolation coefficients corresponding to positional relationships along the Y-coordinate axis in the positional relationships between the approximate point and the interpolation original pixels, outputs the interpolation coefficients corresponding to the positional relationships along the X-coordinate axis, outputs the interpolation coefficients corresponding to the positional relationships along the Y-coordinate axis, and accumulates two interpolation coefficients along the X- and Y-coordinate axes for the same interpolation original pixel, obtaining an interpolation coefficient for each interpolation original pixel.

20. An apparatus according to claim 13, wherein said coefficient buffer stores, in advance as the interpolation coefficients, only interpolation coefficients in one of directions from the approximate point among interpolation coefficients calculated by a symmetrical interpolation function centered on the approximate point, selects an interpolation coefficient in said one direction from the approximate point from the interpolation coefficients in said coefficient buffer in accordance with a positional relationship between the approximate point and the interpolation coefficient, and selects an interpolation coefficient in a direction opposite to said one direction from the interpolation coefficients in said coefficient buffer in accordance with a positional relationship obtained by sign-inverting the positional relationship between the approximate point and the interpolation coefficient.

21. An apparatus according to claim 13, wherein when the approximate point coincides with a position of an arbitrary interpolation original pixel, said coefficient buffer stores, in advance as the interpolation coefficient, an interpolation coefficient with which all interpolation coefficients corresponding to other interpolation original pixels become 0.

22. An apparatus according to claim 13, wherein said interpolation position operation means specifies a reference original pixel serving a reference among four original pixels constituting a submatrix to which the approximate point belongs, on the basis of an integral part of a position of the approximate point obtained on the assumption that a distance between the original pixels is 1, and reads outs pixel values of interpolation original pixels used for one interpolation operation from said coefficient buffer on the basis of the reference original pixel.

23. An apparatus according to claim 22, wherein said interpolation position operation means calculates a positional relationship between the approximate point and the reference original pixel on the basis of a decimal part of the position of the approximate point obtained on the assumption that the distance between the original pixels is 1, and reads out coefficient values of interpolation coefficients used for one interpolation operation from said coefficient buffer on the basis of the positional relationship.

24. An apparatus according to claim 13, wherein in calculating a new pixel position of each pixel constituting a new image, said interpolation position operation means calculates a coordinate value of the new pixel position along one of X- and Y-coordinate axes in accordance with a magnification along said one coordinate axis, and calculates a coordinate value of the new pixel position along the other coordinate axis by a predetermined function using the coordinate value as a parameter.

* * * * *

UNITED STATES PATENT AND TRADEMARK OFFICE
CERTIFICATE OF CORRECTION

PATENT NO. : 6,915,026 B2
DATED : July 5, 2005
INVENTOR(S) : Sasai, Toshihiro

Page 1 of 1

It is certified that error appears in the above-identified patent and that said Letters Patent is hereby corrected as shown below:

<u>Title page,</u>
Item [73], should read:
-- [73] Assignee: NuCORE Technology Inc., Sunnyvale, CA (US) --.

Signed and Sealed this

Twenty-seventh Day of September, 2005

JON W. DUDAS
*Director of the United States Patent and Trademark Office*